Figure 1:
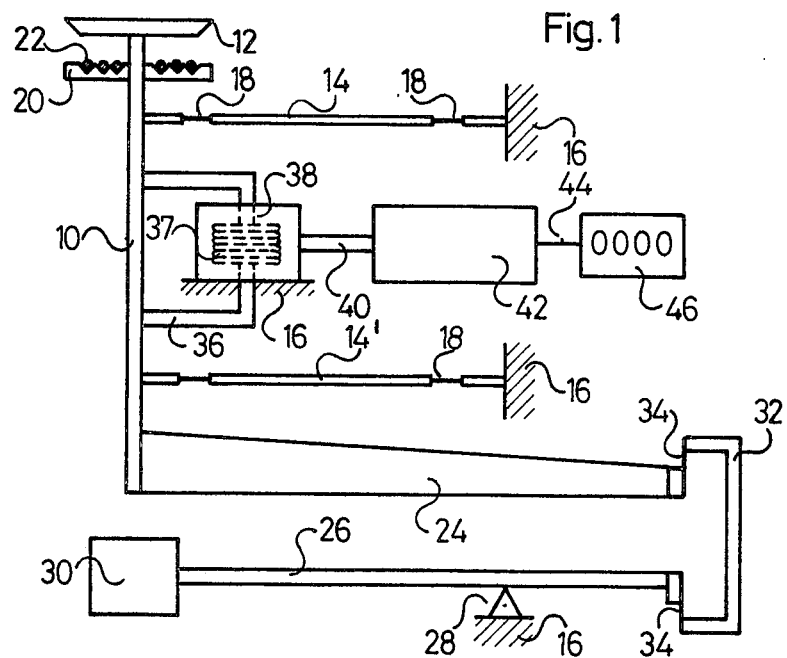

United States Patent [19]

Meier

[11] 4,100,985
[45] Jul. 18, 1978

[54] VIBRATION-RESISTANT BALANCE

[75] Inventor: Eugen Meier, Meilen, Switzerland

[73] Assignee: Mettler Instrumente Ag, Greifensee-Zurich, Switzerland

[21] Appl. No.: 792,598

[22] Filed: May 2, 1977

[30] Foreign Application Priority Data

Oct. 8, 1976 [CH] Switzerland ............... 12789/76

[51] Int. Cl.² .................................. G01G 23/12
[52] U.S. Cl. ...................... 177/189; 177/210 EM; 177/229
[58] Field of Search ............ 177/189, 184, 210 EM, 177/212, 229

[56] References Cited

U.S. PATENT DOCUMENTS

| 3,078,936 | 2/1963 | Thomson | 177/210 EM |
| 3,685,604 | 8/1972 | Smith | 177/184 |
| 3,799,281 | 3/1974 | Wernitz | 177/210 EM |

Primary Examiner—Joseph W. Hartary
Attorney, Agent, or Firm—Hans Berman

[57] ABSTRACT

A balance relatively insensitive to vibration of its support has a weighing pan mounted on a pan carrier which is one of the two normally vertical members of a parallelogram linkage, the other members being the stationary balance casing and two links hingedly interposed between the pan carrier and the casing. A solenoid assembly opposes displacement of the pan carrier under the weight of a load on the pan. The pan carrier is hingedly coupled to one arm of a lever fulcrumed on the balance casing whose other arm carries a counterweight in such a manner that inertial forces acting on the pan carrier and counterweight respectively during vibratory motion of the casing oppose each other.

6 Claims, 2 Drawing Figures

VIBRATION-RESISTANT BALANCE

This invention relates to balances, and particularly to an improved balance in which a carrier for a weighing pan is secured to the supporting structure of the balance by a parallelogram linkage having normally horizontal pivot axes.

Balances of the type described are sensitive to vibrations of the supporting balance structure. At certain frequencies of vibration, the weight indications furnished by the balance are unsteady, and it may be difficult or even impossible to obtain a valid reading. Springs and electrical compensating arrangements were employed heretofore to balance the dead weight of the load-carrying balance elements, and heavy balance tables had to be resorted to for protecting precision balances against external vibrations.

One of the important objects of this invention is the provision of a balance of the type described in which sensitivity to external vibrations is sharply reduced by simple means which simultaneously compensate for the dead weight of the load-carrying balance elements.

According to one of the more specific aspects of this invention, a two-armed lever is mounted on the supporting balance structure. Its pivot axis is at least approximately parallel to the axes of the parallelogram linkage which guides the elongated pan carrier of the balance toward and away from a position of equilibrium in such a manner that the direction of pan carrier elongation remains parallel to the direction of elongation in the equilibrium position.

One arm of the lever is coupled to the pan carrier for joint movement, and the other lever arm carries a counterweight. The counterweight is transversely spaced from the pivot axis of the lever in the same direction in which the pan carrier is spaced from the axes of the parallelogram linkage on the supporting balance structure.

Other features, additional objects, and many of the attendant advantages of this invention will readily be appreciated as the same becomes better understood by reference to the following detailed description of preferred embodiments when considered in connection with the appended drawing in which:

FIG. 1 shows a balance of the invention in a simplified, elevational view; and

Figure 2:
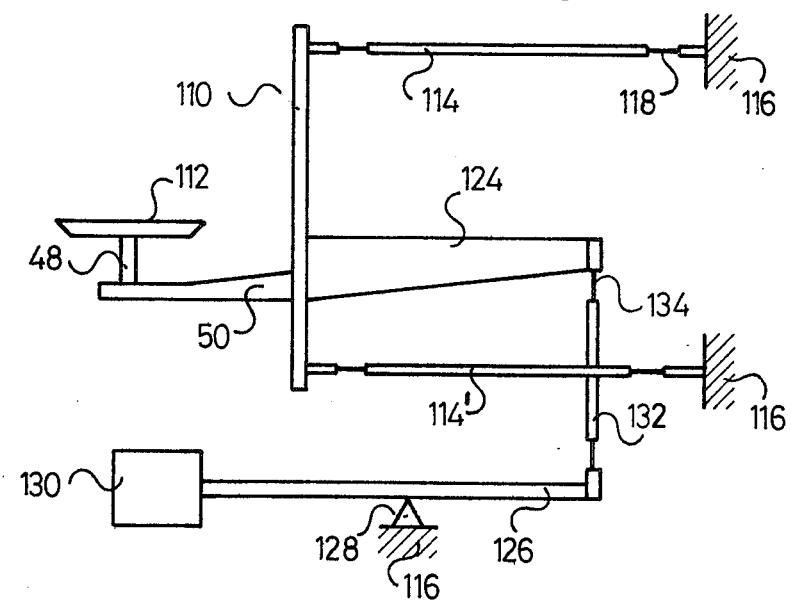

FIG. 2 similarly illustrates another balance of the invention.

Referring initially to FIG. 1, there is shown only as much of a partly conventional, single-pan, top-loading balance as is needed for an understanding of the invention.

The pan carrier 10 of the balance is a bar which is vertically elongated in the illustrated, equilibrium position of the balance. A weighing pan 12 is attached to its upper end. Two vertically spaced guide links 14, 14' horizontally connect the pan carrier 10 with the supporting casing 16 of the balance, only partly illustrated. The guides 14, 14' are Y-shaped or triangular in top view, as is conventional and not explicitly illustrated, one corner of the triangle or the stem of the Y-shape being hingedly fastened to the carrier 10 by flexible bands or strips 18, the other two corners of the triangle or the branches of the Y being similarly fastened to the casing 16 in a common horizontal plane. The guide links 14, 14', the pan carrier 10, and the balance casing 16 thus constitute a four-bar, parallelogram linkage which keeps the direction of elongation of the pan carrier 10 vertical and parallel to itself in all its positions, the pivot axes of the linkage being defined by the bands 18 and being at least approximately parallel and horizontal.

Brackets 20 on the pan carrier 10 subjacent the pan 12 carry annular weights 22 which may be removed for varying the weighing range of the balance. The remotely controlled mechanism for removing and replacing individual weights 22 is conventional and has not been illustrated since it is not directly related to this invention.

A rigid arm 24 projects horizontally from the lower end of the pan carrier 10 toward the other fixed member of the parallelogram linkage. A lever 26 is pivoted on the balance casing 16 below the arm 24 on the knife edge bearing 28. One of the lever arms carries a counterweight 30 which is aligned vertically and longitudinally of the pan carrier 10 with the weighing pan 12. The other arm of the lever 26 is coupled to the rigid arm 24 by means of an approximately U-shaped bar 32 and two flexible bands 34, hingedly connecting respective ends of the bar 32 to the free ends of the arm 24 and of the other lever arm.

The known electromagnetic compensating and weight-indicating system of the balance is partly located between the guide links 14, 14'. Two brackets 36 on the pan carrier 10 hold a solenoid coil 37 which is vertically movable in a housing 38 mounted on the balance casing 16. Permanent magnets, not specifically illustrated, in the housing 38 act on the coil 37 when it is energized through conductors 40 by the electrical control system of the balance. Only a housing 42 of the control system is seen in FIG. 1. The housing 38 also encloses a sensor (conventional and not shown) which transmits a signal indicative of the position of the coil 37 to the controls in the housing 42. A cable 44 connects the controls in the housing 42 to a digital read-out 46 which indicates the weight of a load on the pan 12.

The mass of the counterweight and the distance of its center of gravity from the bearing 28 are selected in such a manner that the dead mass of the pan carrier 10 and of elements transmitting their weight to the pan carrier is at least approximately balanced. Only minimal current needs to be passed through the coil 37 to hold the empty balance in its position of equilibrium. The counterweight 30 suppresses vibration of the pan carrier 10 most effectively if the distance of its center of gravity from the bearing 28 is approximately equal to the effective length of the guide links 14, 14', that is the horizontal spacing of the pivot axis between the links and the casing 16 from the pivot axis between the links and the pan carrier 10, and the center of gravity of the counterweight is vertically aligned with the common center of gravity of the pan carrier 10 and of the associated elements.

From a practical point of view, the effective lengths of the links 14, 14' may differ from the effective length of the arm of the lever 26 carrying the counterweight 30 by as much as plus/minus 50% without losing all the significant benefits of the counterweight. If the counterweight is vertically aligned with the pan 12, that is, longitudinally of the pan carrier 10 in the embodiment of the invention illustrated in FIG. 1, the load on the pan 12 has only a minimal influence on the function of the counterweight.

In the modified balance illustrated in FIG. 2, a parallelogram linkage analogous to that described above is constituted by a normally vertical pan carrier bar 110, the stationary balance casing 116, and two approximately horizontal, vertically spaced, identical guide links 114, 114' which are Y-shaped or triangular, as is not explicitly shown. The pivots of the linkage are provided by flexible bands 118. A central stem 48 downwardly extends from the single weighing pan 112 toward a horizontal bracket 50 attached to the pan carrier 110 nearer the lower guide link 114' than the upper guide link 114.

The free end of an arm 124 horizontally projecting from the pan carrier bar 110 is coupled by two flexible bands 134 and an interposed rigid bar 132 to one arm of a lever 126 supported by a knife edge bearing 128 on the balance casing 116. The other arm of the lever 126 carries a counterweight 130 vertically aligned with the weighing pan 112 and has an effective length within plus/minus 50% of the effective length of the guide links 114, 114' as discussed above with reference to FIG. 1.

While the arm 24 shown in FIG. 1 is substantially longer horizontally than the links 14, 14', the arm 124 is shorter than the links 114, 114' so that the coupling bar 132 passes through an opening in the lower guide link 114'. The balance shown in FIG. 2 is substantially lower than that of FIG. 1, and the increase in its horizontal dimension in the plane of the drawing is held to a minimum by the shorter arm 124.

As is not shown in FIG. 2, compensating weights are releasably mounted below the stem 48 subjacent the weighing pan 112, and a solenoid coil on the pan carrier 110 provides the input signals for the non-illustrated electrical controls and read-out of the modified balance, the arrangement being as illustrated in FIG. 1.

It has been found that the coupling of the pan carrier to a counterweight in the manner described and illustrated reduces the effect of external vibrations on the balances of this invention to a small fraction of the effect on otherwise similar balances not so equipped. Angular oscillations of the supporting structure are particularly well compensated for. Smaller and lighter balance tables may be employed with balances of this invention even where the dead weight of the movable balance elements is many times greater than the weighing range of the balance.

Because the counterweight compensates at least for a major portion of the dead weight of the pan carrier and of elements associated therewith, the balances of the invention provide weight readings faster than otherwise similar balances relying on compensating springs or features of the electrical controls for the same purpose.

The counterweight arrangement of the invention is equally beneficial in balances in which hinged connections are provided by knife edge bearings instead of the illustrated flexible bands which are usually preferred in this type of balance. The length of the path traveled by the weighing pan is of little significance, if any, on the advantages derived from the counterweight arrangement, and the primary features of this invention are applicable to balances whose pans are or are not practically stationary.

It should be understood, therefore, that the foregoing disclosure relates only to presently preferred embodiments, and that it is intended to cover all changes and modifications of the examples of the invention herein chosen for the purpose of the disclosure which do not depart from the spirit and scope of the invention set forth in the appended claims.

What is claimed is:

1. In a balance, in combination:
   (a) a support;
   (b) an elongated pan carrier;
   (c) guide means pivoted to said support for angular movement about a first axis and connected to said pan carrier for guiding movement of the same toward and away from a position of equilibrium relative to said support, the direction of elongation of said pan carrier during said movement thereof remaining parallel to said direction of elongation in said position of equilibrium;
   (d) electrically operated means for opposing said movement;
   (e) a lever mounted on said support for pivoting movement about a second axis, said lever having two arms;
   (f) coupling means coupling one of said arms to said pan carrier for joint movement; and
   (g) a counterweight on the other arm of said lever, said counterweight being offset from said second axis in a predetermined direction transverse to said second axis, said pan carrier being offset from said first axis in said predetermined direction.

2. In a balance as set forth in claim 1, a weighing pan mounted on said pan carrier for movement therewith, said guide means including means for moving said weighing pan vertically in the normal operating position of said balance, said axes being substantially horizontal in said operating position, said weighing pan being aligned in a vertical direction with said counterweight in at least one position of said pan carrier during said movement of the same.

3. In a balance as set forth in claim 1, a weighing pan mounted on said pan carrier for movement therewith and aligned with said counterweight in said direction of elongation when said pan carrier is in said position of equilibrium.

4. In a balance as set forth in claim 1, hinge means securing said guide means to said pan carrier for relative movement about a third axis substantially parallel to said first and second axes, the spacing of said third axis from said first axis being within plus/minus 50% of the spacing of the center of gravity of said counterweight from said second axis.

5. In a balance as set forth in claim 1, a range-defining weight releasably secured to said pan carrier.

6. In a balance as set forth in claim 1, a weighing pan, said guide means including two guide members vertically spaced in the normal operating position of said balance, said axes being horizontal in said operating condition and said direction of elongation extending vertically, said guide members, said support, and said pan carrier jointly constituting a parallelogram linkage, said weighing pan being secured to a portion of said pan carrier nearer the lower one of said guide members than the upper one.

* * * * *